US011772538B2

(12) United States Patent
Jiang et al.

(10) Patent No.: US 11,772,538 B2
(45) Date of Patent: Oct. 3, 2023

(54) CUP HOLDER ASSEMBLY WITH EXPANDABLE CUP SUPPORT

(71) Applicant: Daimay North America Automotive, Inc., Redford, MI (US)

(72) Inventors: Yintai Jiang, Shanghai (CN); Jianhu Wang, Novi, MI (US)

(73) Assignee: Daimay North America Automotive, Inc., Redford, MI (US)

( * ) Notice: Subject to any disclaimer, the term of this patent is extended or adjusted under 35 U.S.C. 154(b) by 514 days.

(21) Appl. No.: 17/263,599

(22) PCT Filed: Dec. 29, 2018

(86) PCT No.: PCT/CN2018/125378
§ 371 (c)(1),
(2) Date: Jan. 27, 2021

(87) PCT Pub. No.: WO2020/133367
PCT Pub. Date: Jul. 2, 2020

(65) Prior Publication Data
US 2021/0291715 A1 Sep. 23, 2021

(51) Int. Cl.
*B60N 3/10* (2006.01)
(52) U.S. Cl.
CPC ............... *B60N 3/10* (2013.01); *B60N 3/102* (2013.01); *B60N 3/105* (2013.01)
(58) Field of Classification Search
CPC .......... B60N 2/793; B60N 3/10; B60N 3/102; B60N 3/105; B60R 7/04; B60R 7/043
USPC ............................................ 296/24.34, 37.15
See application file for complete search history.

(56) References Cited

U.S. PATENT DOCUMENTS

| 5,302,000 | A | 4/1994 | Ayotte | |
|---|---|---|---|---|
| 6,050,468 | A * | 4/2000 | Kelley | B60N 3/107 224/552 |
| 6,834,838 | B2 * | 12/2004 | Dennis | B60N 3/102 403/349 |
| 7,614,703 | B2 | 12/2009 | Bergin | |
| 8,579,149 | B2 | 11/2013 | Henke et al. | |
| 9,050,910 | B2 | 6/2015 | Kim | |
| 9,706,865 | B2 | 7/2017 | Shen | |
| 2009/0039095 | A1 * | 2/2009 | Ogura | B60N 3/106 220/737 |
| 2013/0075562 | A1 | 3/2013 | Miklas | |
| 2013/0181000 | A1 | 7/2013 | Miksovsky et al. | |
| 2016/0000248 | A1 * | 1/2016 | Shen | A47G 23/0216 220/737 |
| 2018/0208094 | A1 | 7/2018 | Medina Luna et al. | |

FOREIGN PATENT DOCUMENTS

DE        102017112154 A1 * 12/2017     ............. B60N 2/757

OTHER PUBLICATIONS

International Search Report and Written Opinion of PCT/CN2018/125378 dated Sep. 30, 2019.

* cited by examiner

*Primary Examiner* — Jason S Daniels
(74) *Attorney, Agent, or Firm* — Carlson, Gaskey & Olds, P.C.

(57) ABSTRACT

An exemplary cup holder assembly includes a frame and a cup support connected to the frame and configured to expand and collapse relative to the frame. The cup support includes a plurality of segments integrally and flexibly connected together.

20 Claims, 5 Drawing Sheets

CUP HOLDER ASSEMBLY WITH EXPANDABLE CUP SUPPORT

TECHNICAL FIELD

This disclosure relates to a cup holder assembly with an expandable cup support. The cup holder assembly may be used in a motor vehicle.

BACKGROUND

Motor vehicles are known to include cup holders. Cup holders are devices configured to hold cups or other drinking vessels, such as mugs, cans, bottles, etc. Cup holders are commonly built into various structures in a motor vehicle, such as arm rests, consoles, etc. Some known cup holders are sized to accept standard-sized drinking vessels. Other cup holders are designed to accommodate drinking vessels of various sizes. Such cup holders may include deflectable tabs or two or more tiers having different diameters.

SUMMARY

A cup holder assembly according to an exemplary aspect of the present disclosure includes, among other things, a frame, and a cup support connected to the frame and configured to expand and collapse relative to the frame. Further, the cup support includes a plurality of segments integrally and flexibly connected together.

In a further non-limiting embodiment of the foregoing cup holder assembly, the segments are annular ring segments concentric with one another.

In a further non-limiting embodiment of any of the foregoing cup holder assemblies, the cup support includes a first segment, a second segment, and a third segment.

In a further non-limiting embodiment of any of the foregoing cup holder assemblies, the first segment is connected to a base, and the base is rigidly connected to the frame.

In a further non-limiting embodiment of any of the foregoing cup holder assemblies, the third segment provides a top of the cup support and is flexibly connected to the first segment via the second segment.

In a further non-limiting embodiment of any of the foregoing cup holder assemblies, a plurality of rounded tabs project inward from the third segment.

In a further non-limiting embodiment of any of the foregoing cup holder assemblies, the plurality of rounded tabs includes four tabs equally spaced-apart from one another about the circumference of the third segment.

In a further non-limiting embodiment of any of the foregoing cup holder assemblies, when the cup support is in a fully collapsed position, the top of the cup support is arranged at a first height above the base. When the cup support is in an intermediate position, the top of the cup support is arranged at a second height above the base, the second height greater than the first height. And when the cup support is in a fully expanded position, the top of the cup support is arranged at a third height above the base, the third height being greater than the second height.

In a further non-limiting embodiment of any of the foregoing cup holder assemblies, the first height is about 30 mm, the second height is about 60 mm, and the third height is about 90 mm.

In a further non-limiting embodiment of any of the foregoing cup holder assemblies, when the cup support is in the fully collapsed position, the first, second, and third segments overlap one another, and the second segment is arranged radially between the first and third segments.

In a further non-limiting embodiment of any of the foregoing cup holder assemblies, when the cup support is in the fully expanded position, the first, second, and third segments are axially spaced-apart from one another.

In a further non-limiting embodiment of any of the foregoing cup holder assemblies, when the cup support is in the intermediate position, the second segment is at least partially folded.

In a further non-limiting embodiment of any of the foregoing cup holder assemblies, the frame includes at least one cutout adjacent the cup support such that a user may grasp an outside of the cup support.

In a further non-limiting embodiment of any of the foregoing cup holder assemblies, the cup support is a first cup support, the cup holder assembly includes a second cup support spaced-apart from the first cup support, and the second cup support is substantially identical to the first cup support.

In a further non-limiting embodiment of any of the foregoing cup holder assemblies, the cup support is configured to expand and collapse relative to the frame without rotating.

A seat assembly according to an exemplary aspect of the present disclosure includes, among other things, a cup holder assembly provided in one of a console and an armrest. The cup holder assembly includes a frame and a cup support connected to the frame and configured to expand and collapse relative to the frame. The cup support includes a plurality of segments integrally and flexibly connected together.

In a further non-limiting embodiment of the foregoing seat assembly, the armrest is one of (1) an armrest integrated into a console between adjacent seats and (2) an armrest connected to a seat back.

In a further non-limiting embodiment of any of the foregoing seat assemblies, the segments are annular ring segments concentric with one another, the cup support includes at least a first segment, a second segment, and a third segment, the first segment is connected to a base rigidly connected to the frame, and the third segment provides a top of the cup support and is flexibly connected to the first segment via the second segment.

In a further non-limiting embodiment of any of the foregoing seat assemblies, when the cup support is in a fully collapsed position, the top of the cup support is arranged at a first height above the base, and the first, second, and third segments overlap one another, and the second segment is arranged radially between the first and third segments. When the cup support is in an intermediate position, the top of the cup support is arranged at a second height above the base, the second height greater than the first height, and the second segment is at least partially folded. When the cup support is in a fully expanded position, the top of the cup support is arranged at a third height above the base, the third height being greater than the second height, and the first, second, and third segments are axially spaced-apart from one another.

In a further non-limiting embodiment of any of the foregoing seat assemblies, the cup support is a first cup support, the cup holder assembly includes a second cup support spaced-apart from the first cup support, and the second cup support is substantially identical to the first cup support.

DETAILED DESCRIPTION

This disclosure relates to a cup holder assembly with an expandable cup support. The cup holder assembly may be used in a motor vehicle. In particular, an exemplary cup holder assembly includes a frame and a cup support connected to the frame and configured to expand and collapse relative to the frame. The cup support includes a plurality of segments integrally and flexibly connected together. By providing an expandable cup support, cup holder assembly—specifically the frame—exhibits a reduced depth relative to known designs. As such, the cup holder assembly occupies less space in an arm rest, for example, and thus allows for thinner, lighter arm rests. Further, by providing the cup support of a plurality of segments which are integrally and flexibly connected, the cup support exhibits a robust design that is relatively easily manufactured. These and other benefits will be appreciated from the below description.

Figure 1:
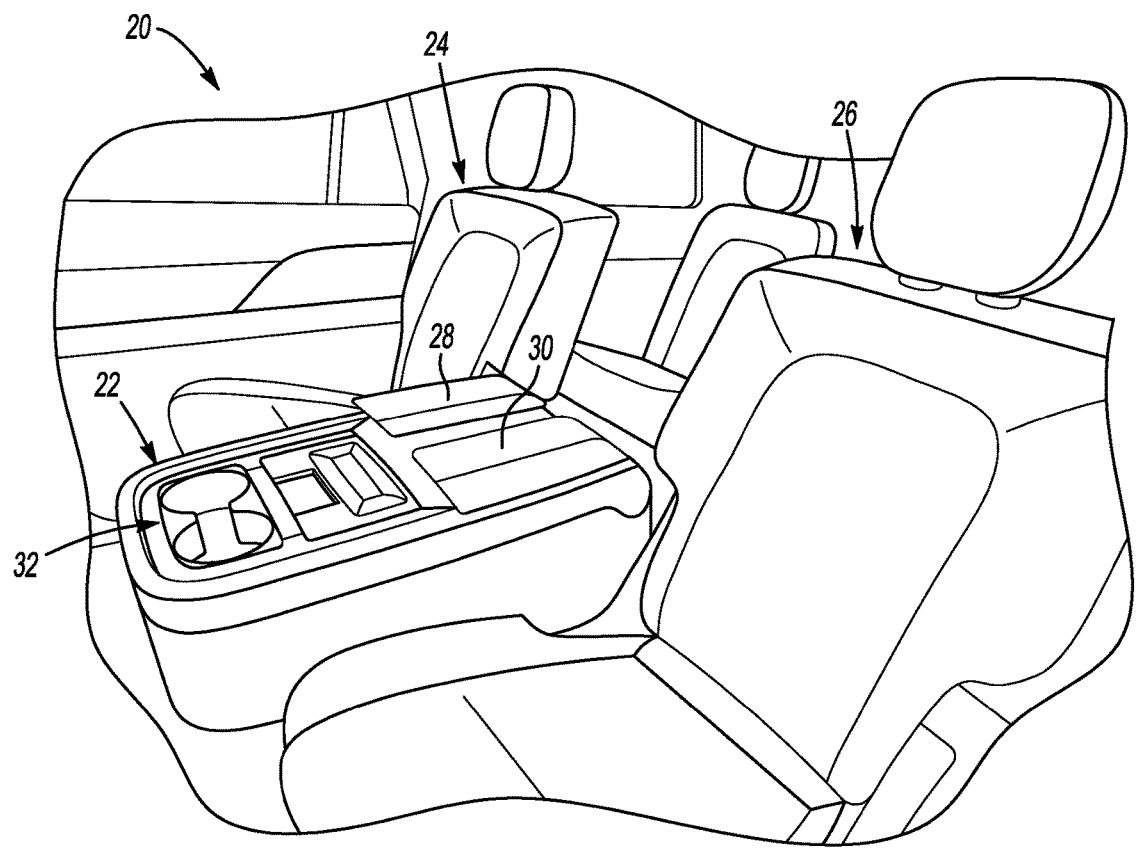
FIG. 1 is a view of a portion of an interior of a motor vehicle.

FIG. 1 illustrates an example section 20 of an interior of a motor vehicle. In this example, the section 20 is a segment of an interior of a sport utility vehicle (SUV), and specifically illustrates a console 22 between two rear bucket seats 24, 26. While an SUV is shown, this disclosure is not limited to SUVs and extends to other types of motor vehicles. Further, this disclosure is not limited to automobiles, and may be useful in other applications, such as in boats, aircraft, etc.

The console 22 includes two armrests 28, 30 and a cup holder assembly 32 for use by the occupants of the seats 24, 26. The detail of the cup holder assembly 32 will be discussed below. While the cup holder assembly 32 is arranged in the console 22 in this example, the cup holder assembly 32 could be incorporated directly into the armrests 28, 30. Alternatively, the cup holder assembly 32 may be incorporated into a folding armrest of a bench seat or into a folding or fixed armrest connected to a seat back of a bucket seat.

Figure 2:
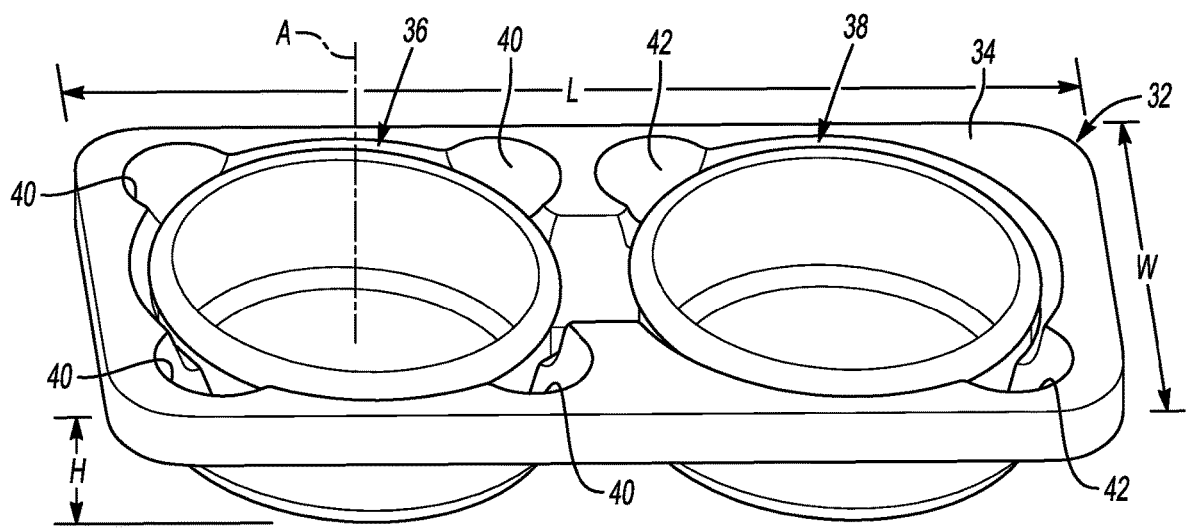
FIG. 2 is a perspective view of an example cup holder assembly.

FIG. 2 is a perspective view of an example cup holder assembly 32. In this example, the cup holder assembly 32 includes a frame 34 and first and second cup supports 36, 38. In FIG. 2, the cup supports 36, 38 are in fully collapsed positions.

While there are two cup supports in the example of FIG. 2, this disclosure extends to cup holder assemblies with at least one cup support. Further, while the cup supports 36, 38 have the term "cup" in their name, it should be understood that the cup supports 36, 38 may be used to support all types of drinking vessels, and are not limited to cups, much like traditional "cup holders" are frequently used to hold more than just cups. The cup supports 36, 38 may also be used to hold items that are not drinking vessels, such as keys, mobile devices, etc.

The frame 34 is made of a rigid material, such as a rigid plastic, in this example. The frame 34 has a length L, width W, and a height H. The first and second cup supports 36, 38 are configured to expand and collapse relative to the frame 34, thereby accommodating cups or other drinking vessels, such as mugs, cans, bottles, etc., of different sizes.

Because the first and second sup supports 36, 38 are configured to expand and collapse, the height H of the frame 34 is reduced relative to known cup holder assemblies. Thus, the cup holder assembly 32 takes up less space within an armrest or console. In turn, the armrest or console can be designed smaller and lighter, requiring less material and taking up less space in a vehicle as compared to prior designs.

Adjacent the cup supports 36, 38, the frame 34 includes a plurality of cutouts such that a user may grasp an outside of the corresponding cup support. For instance, in FIG. 2, the frame 34 includes four cutouts 40 equally spaced-apart from one another about the circumference of the cup support 36. The frame 34 further includes two cutouts 42 arranged about 180° apart from one another relative to the circumference of the cup support 38. The arrangements of the cutouts 40, 42 is exemplary only, and the frame 34 may include alternate cutout arrangements.

Figure 3:
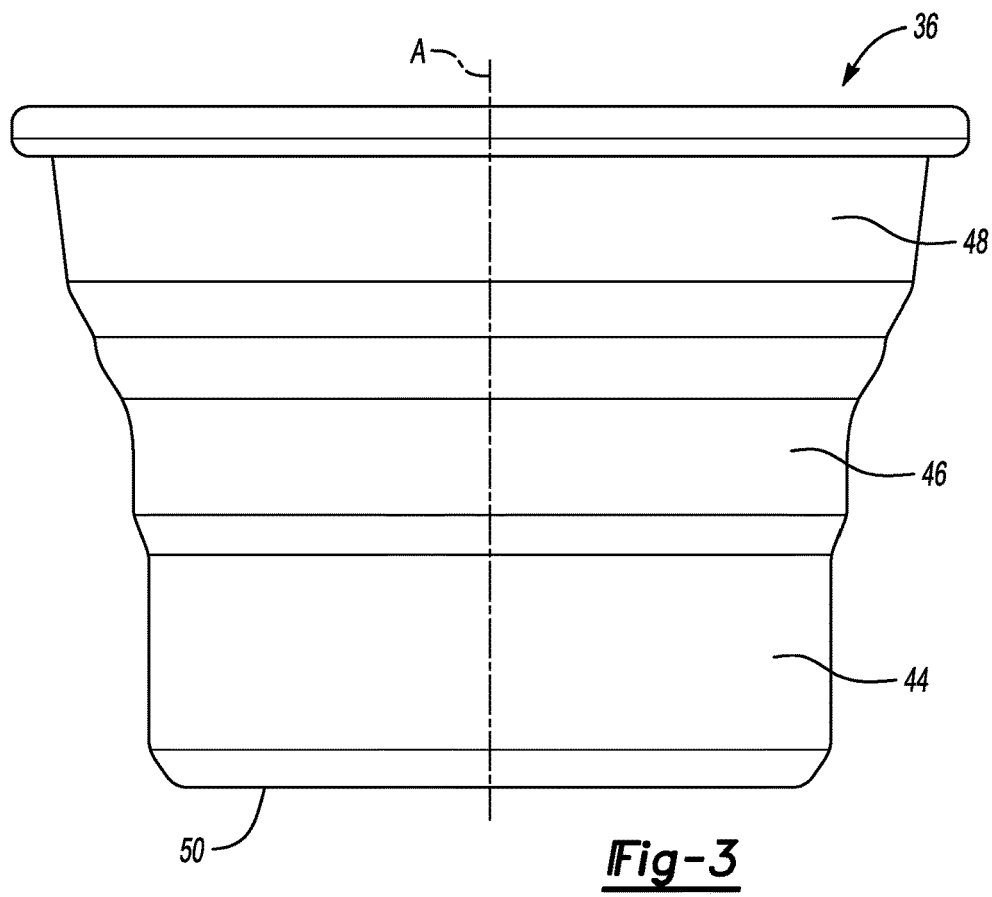
FIG. 3 is an exterior side view of an example cup support in a fully expanded position.

FIG. 3 is a side view of the cup support 36. While the cup support 38 is not shown in FIG. 3, it should be understood that the cup supports 36, 38 are substantially identical. In FIG. 3, the cup support 36 is in a fully expanded position.

The cup support 36 includes plurality of segments integrally and flexibly connected together. In particular, the cup support 36 includes three annular segments 44, 46, 48, which may be referred to as first, second, and third segments 44, 46, 48, respectively. The annular segments 44, 46, 48 are concentric with one another about a central axis A of the cup support 36. Further, the annular segments 44, 46, 48 are integrally formed from the same piece of elastomeric material, such as rubber. Thus, the cup support 36 is substantially flexible, and in particular is more flexible than the frame 34. The flexibility of the cup support 36 facilitates movement of the cup support 36 between the fully collapsed and fully expanded positions, which will be described below.

While three annular segments 44, 46, 48 are shown, this disclosure extends to cup supports with two or more segments. Further, while the segments 44, 46, 48 are annular, the segments could exhibit other shapes, such as being square, square with rounded corners (i.e., "squircle" shaped), etc.

Together the three annular segments 44, 46, 48 define a side wall structure of the cup support 36. The cup support 36 further includes base 50 which extends substantially normal to the central axis A. In this example, the base 50 is rigidly connected to the frame 34, such as by being glued thereto, for example. In other words, during normal operating conditions, the base 50 is not configured to move relative to the frame 34. The first segment 44 may also be rigidly connected to the frame 34, such as by gluing, in order to provide additional support.

Figure 4:
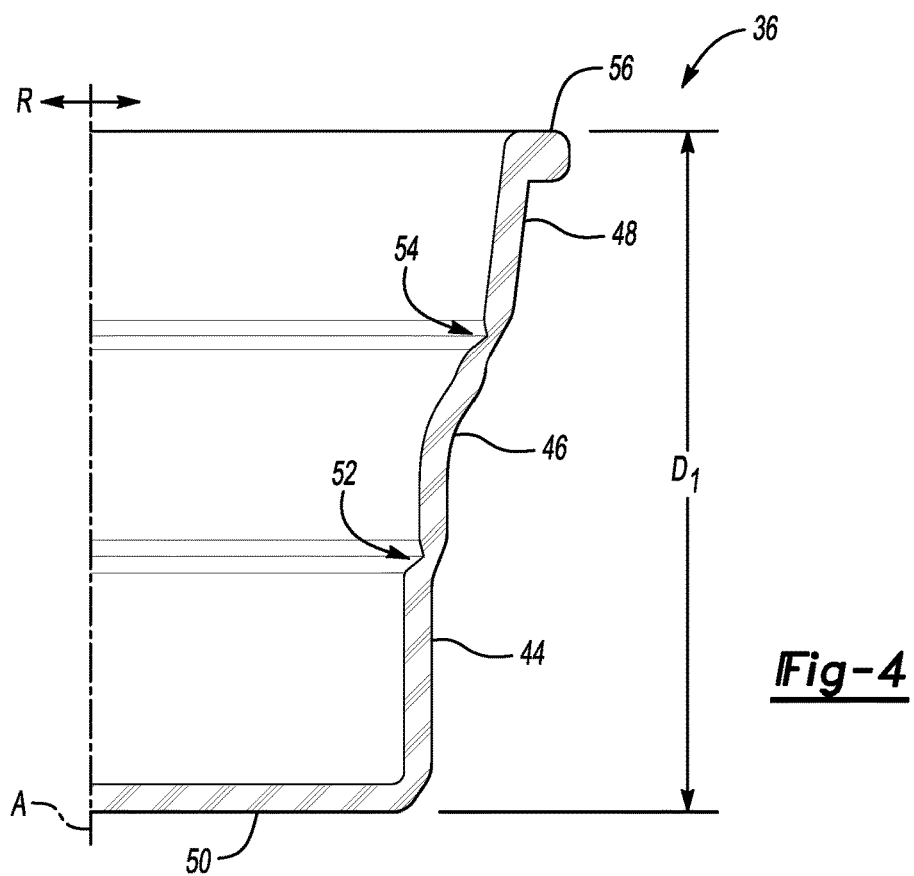
FIG. 4 is a partial cross-sectional view of the example cup support in the fully expanded position.

FIG. 4 shows a portion of the cup support 36 in cross-section, with the cup support 36 in the fully expanded position. As shown in FIG. 4, the first segment 44 is connected to the base 50. The second segment 46 is between the first segment 44 and the third segment 48, the latter of which provides a top of the cup support 36. The third segment 48 is flexibly connected to the first segment 44 via the second segment 46.

To facilitate collapsing and expanding of the cup support 36, the thickness of the side wall defined by the first segment 44, second segment 46, and third segment 48 is not uniform. Rather, at the transition 52 between the first segment 44 and the second segment 46, and also at the transition 54 between the second segment 46 and the third segment 48, the side wall necks down and exhibits a reduced thickness.

Figure 5:
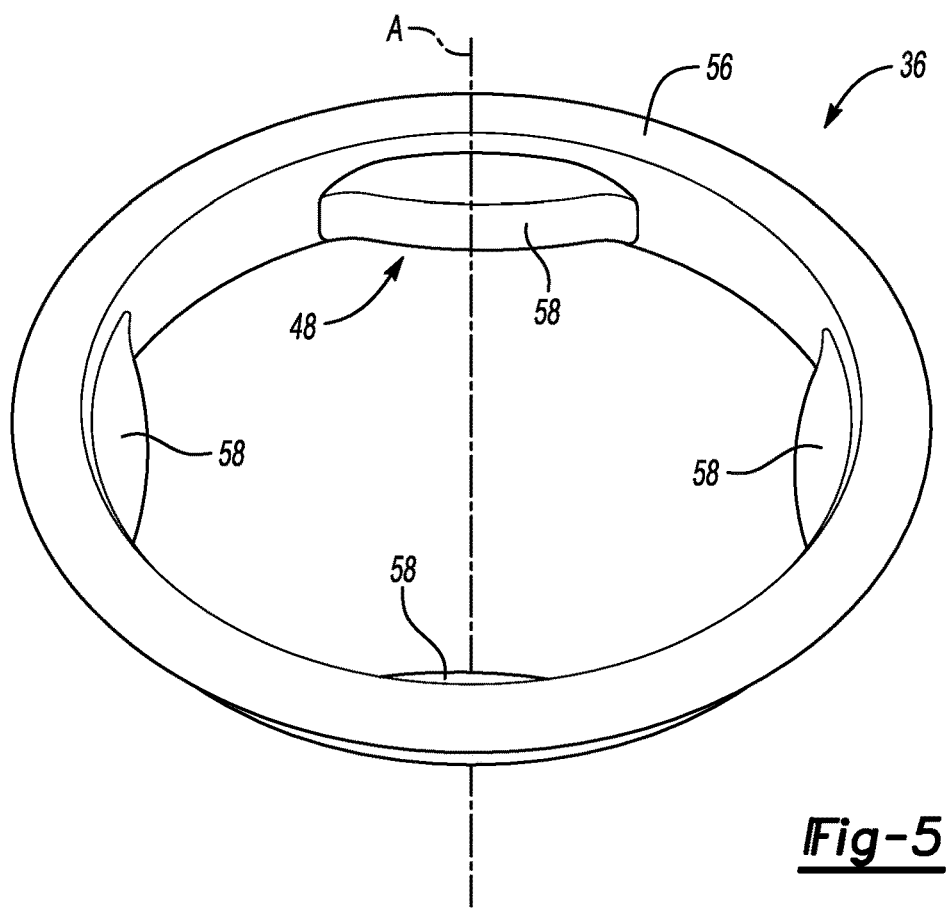
FIG. 5 is a perspective view of an example arrangement of a third segment of the cup support including a plurality of tabs.

At the top of the cup support 36, furthest away from the base 50, the third segment 48 provides an upper edge 56, which is rounded and extends about the circumference of the cup support 36. As generally shown in FIG. 5, the third segment 48 may optionally include a plurality of tabs 58 which project inward toward the axis A to support a cup or drinking vessel placed in the cup support 36. The tabs 58 may be made of the same material as the remainder of the cup support 36, and may be integrally formed with the remainder cup support 36. The tabs 58 are generally rounded in this example. Further, in this example there are four tabs 58, and the tabs are equally spaced-apart about the circumference of the third segment 48. Tabs are not required in this disclosure, and if they are included, this disclosure is not limited to the illustrated tab arrangement.

Three configurations of the cup support 36 will now be described in detail. The cup support 36 is selectively expandable and collapsible to one of these three configurations upon application of force by a user. The user may selectively set the cup support 36 in one of the configurations to accommodate a drinking vessel of a particular size, for example.

Figure 6:
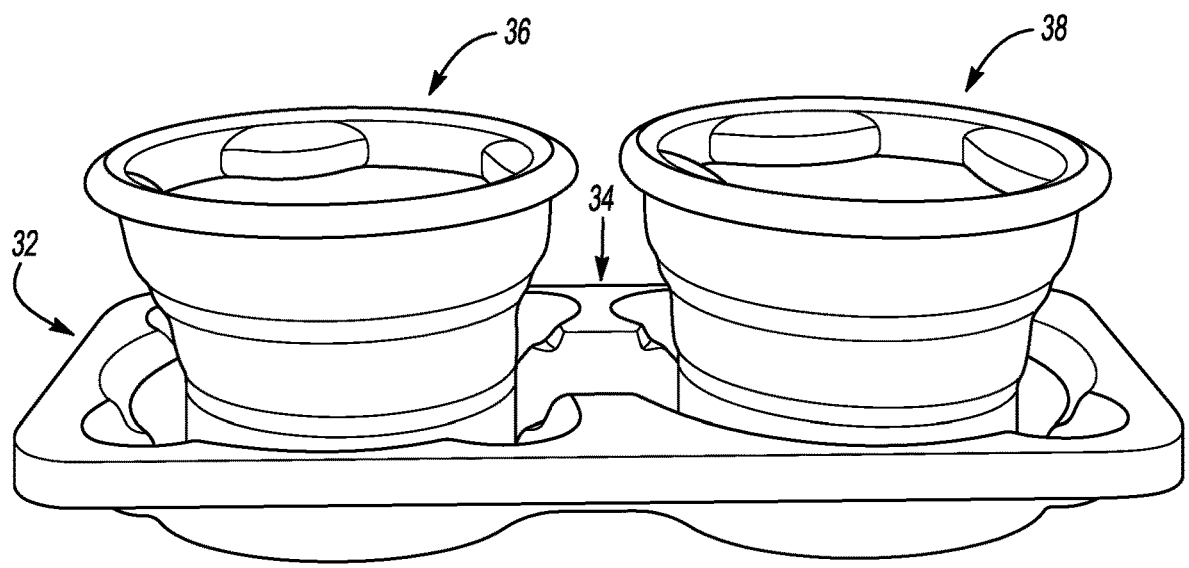
FIG. 6 is a side-perspective view of the example cup holder assembly with first and second cup supports in the fully expanded position.

FIG. 4 is representative of the cup support 36 in a fully expanded position. FIG. 6 is representative of the entire cup holder assembly 32, with both the first and second cup supports 36, 38 in the fully expanded position. In the fully expanded position, the first and second cup supports 36, 38 project above the frame 34.

With reference to FIG. 4, in the fully expanded position, the top (i.e. the upper edge 56) of the cup support 36 is arranged at a height $D_1$ above the base 50. Further, the first, second, and third segments 44, 46, 48 are axially-spaced apart from one another, meaning the segments do not overlap one another in a radial direction R normal to the axis A.

Figure 7:
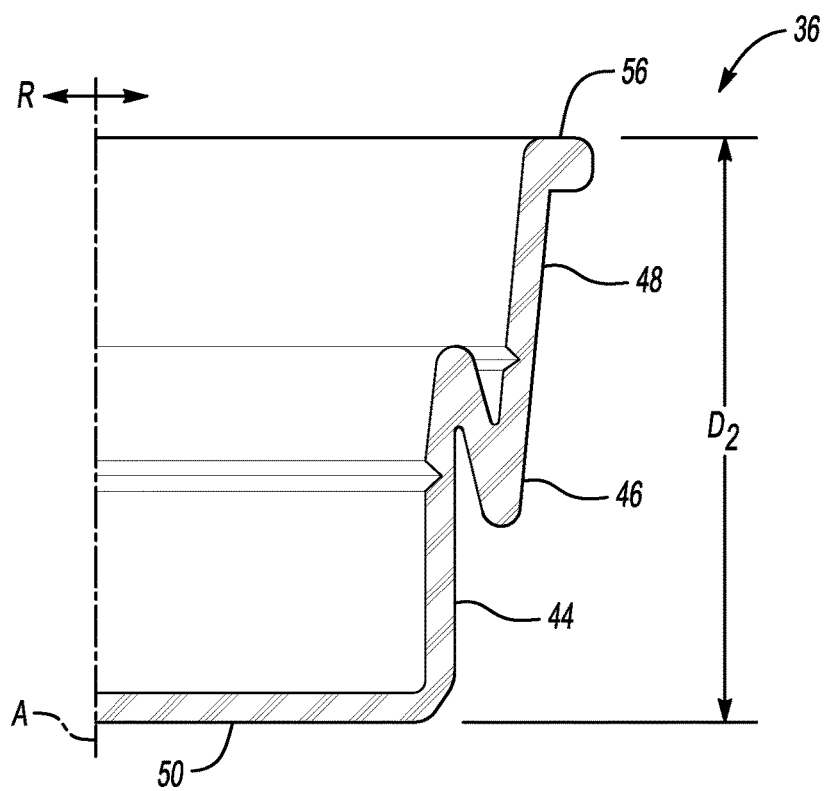
FIG. 7 is a partial cross-sectional view of the example cup support in an intermediate position.
Figure 8:
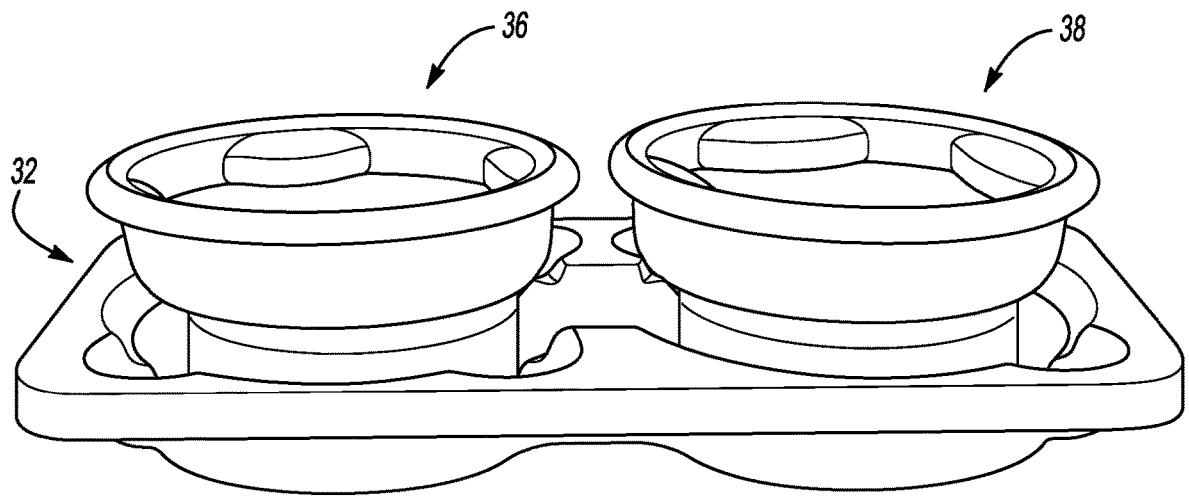
FIG. 8 is a side-perspective view of the example cup holder assembly with the first and second cup supports in the intermediate position.

FIG. 7 is a partial cross-sectional view of the cup support 36, similar to that of FIG. 4, and is representative of the cup support in an intermediate position. FIG. 8 is representative of the entire cup holder assembly 32 with the cup supports 36, 38 in the intermediate position. In the intermediate position, the cup supports 36, 38 still project above the frame 34, but to a lesser extent than in the fully expanded position.

In the intermediate position, the top (i.e. the upper edge 56) of the cup support 36 is arranged at a height $D_2$ above the base 50, which is less than the height $D_1$. Further, the second segment 46 is at least partially folded. The second segment 46 is relatively easily folded by virtue of being made of a flexible material.

Figure 9:
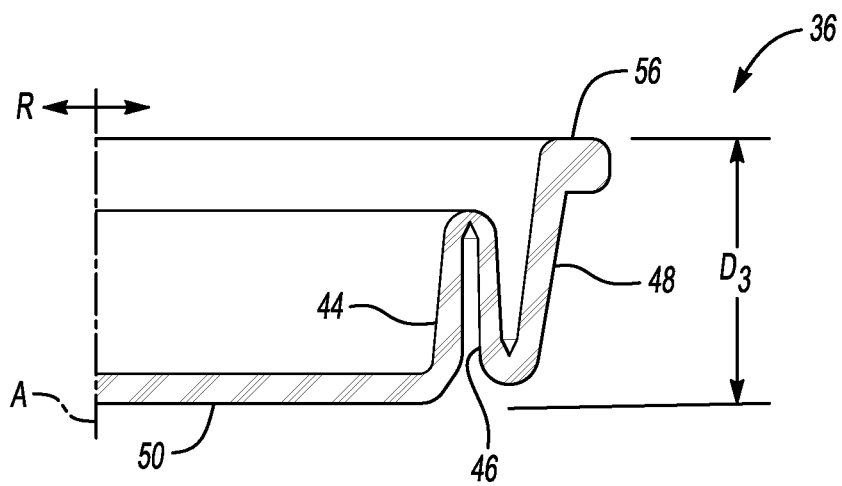
FIG. 9 is a partial cross-sectional view of the example cup support in a fully collapsed position.
Figure 10:
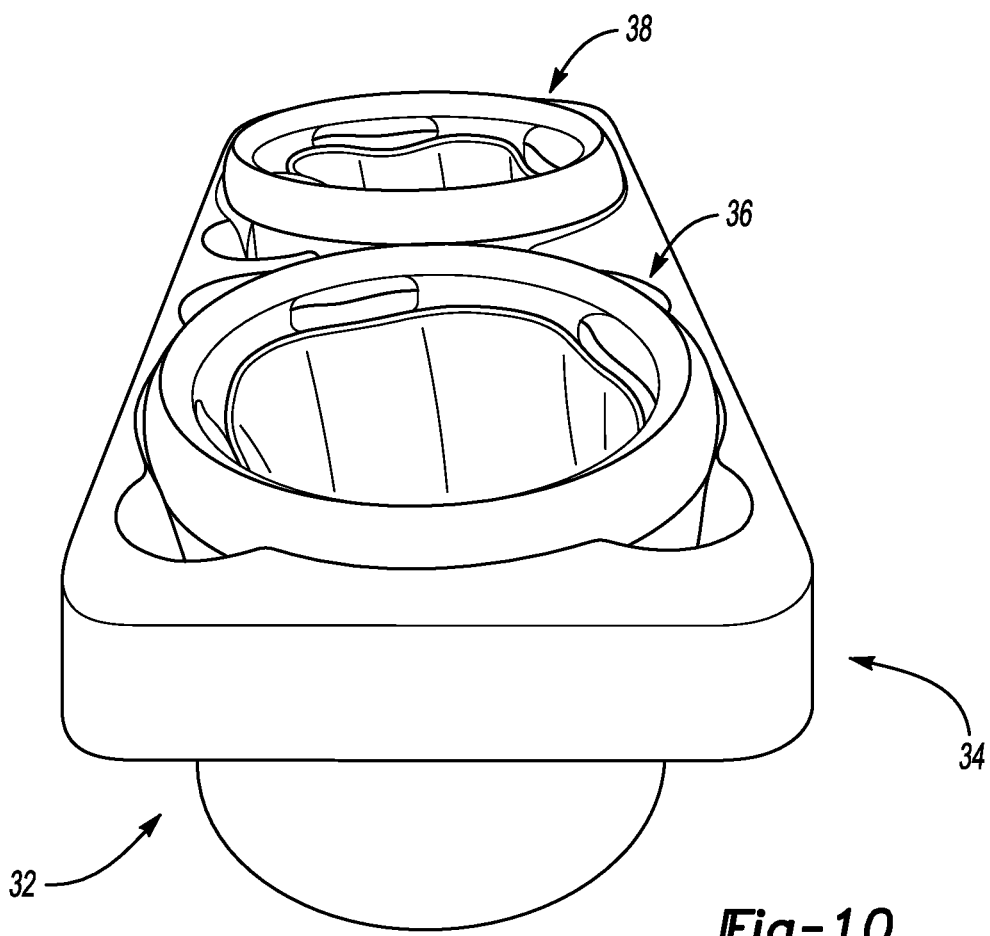
FIG. 10 is an end-perspective view of the example cup holder assembly with the first and second cup supports in the fully collapsed position.

FIG. 9 is a partial cross-sectional view of the cup support 36, similar to that of FIGS. 4 and 7, but FIG. 9 is representative of the cup support 36 in a fully collapsed position. FIG. 10 is representative of the entire cup holder assembly 32 with the cup supports 36, 38 in the fully collapsed position. In the fully collapsed position, the first and second cup supports 36, 38 are substantially flush with a the top of the frame (i.e., they do not project significantly, if at all, above the frame).

In the fully collapsed position, the top (i.e. the upper edge 56) of the cup support 36 is arranged at a height $D_3$ above the base 50, which is less than the heights $D_1$ and $D_2$. As non-limiting examples, the height $D_3$ is about 30 mm, the height $D_2$ is about 60 mm, and the height $D_1$ is about 90 mm. In the fully collapsed position, the first, second, and third segments 44, 46, 48 overlap one another in the radial direction R, and specifically the second segment is arranged radially—relative to the radial direction R—between the first and third segments 44, 48.

The above-discussed arrangement allows a user to move the cup supports 36, 38 between the fully collapsed and fully expanded positions by moving the cup supports 36, 38 vertically and without rotating the cup supports 36, 38 about an axis, such as the axis A. In this way, the cup supports 36, 38 are moveable in a way that is more intuitive for a user.

It should be understood that directional terms such as "upper," "lower," "axial," and "radial" are used above with reference to the normal orientation of a cup holder assembly. These terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A cup holder assembly, comprising:
    a frame; and
    a cup support connected to the frame and configured to expand and collapse relative to the frame, the cup support including a plurality of segments integrally and flexibly connected together, wherein the cup support is expandable such that a top of the cup support is moveable vertically above a base of the frame when the cup support is in a fully expanded position.

2. The cup holder assembly as recited in claim 1, wherein the segments are annular ring segments concentric with one another.

3. The cup holder assembly as recited in claim 2, wherein the cup support includes a first segment, a second segment, and a third segment.

4. The cup holder assembly as recited in claim 3, wherein the first segment is connected to the base, and the base is rigidly connected to the frame.

5. The cup holder assembly as recited in claim 4, wherein the third segment provides the top of the cup support and is flexibly connected to the first segment via the second segment.

6. The cup holder assembly as recited in claim 5, wherein a plurality of rounded tabs project inward from the third segment.

7. The cup holder assembly as recited in claim 6, wherein the plurality of rounded tabs includes four tabs equally spaced-apart from one another about the circumference of the third segment.

8. The cup holder assembly as recited in claim 5, wherein:
when the cup support is in a fully collapsed position, the top of the cup support is arranged at a first height above the base,
when the cup support is in an intermediate position, the top of the cup support is arranged at a second height above the base, the second height greater than the first height, and
when the cup support is in the fully expanded position, the top of the cup support is arranged at a third height above the base, the third height being greater than the second height.

9. The cup holder assembly as recited in claim 8, wherein:
the first height is about 30 mm,
the second height is about 60 mm, and
the third height is about 90 mm.

10. The cup holder assembly as recited in claim 8, wherein, when the cup support is in the fully collapsed position, the first, second, and third segments overlap one another, and the second segment is arranged radially between the first and third segments.

11. The cup holder assembly as recited in claim 10, wherein, when the cup support is in the fully expanded position, the first, second, and third segments are axially spaced-apart from one another.

12. The cup holder assembly as recited in claim 11, wherein, when the cup support is in the intermediate position, the second segment is at least partially folded.

13. The cup holder assembly as recited in claim 1, wherein the frame includes at least one cutout adjacent the cup support such that a user may grasp an outside of the cup support.

14. The cup holder assembly as recited in claim 1, wherein:
the cup support is a first cup support,
the cup holder assembly includes a second cup support spaced-apart from the first cup support, and
the second cup support is substantially identical to the first cup support.

15. The cup holder assembly as recited in claim 1, wherein the cup support is configured to expand and collapse relative to the frame without rotating.

16. A seat assembly, comprising:
a cup holder assembly provided in one of a console and an armrest, the cup holder assembly comprising:
a frame; and
a cup support connected to the frame and configured to expand and collapse relative to the frame, the cup support including a plurality of segments integrally and flexibly connected together, wherein the cup support is expandable such that a top of the cup support is moveable vertically above a base of the frame when the cup support is in a fully expanded position.

17. The seat assembly as recited in claim 16, wherein the armrest is one of (1) an armrest integrated into a console between adjacent seats and (2) an armrest connected to a seat back.

18. The seat assembly as recited in claim 16, wherein:
the segments are annular ring segments concentric with one another,
the cup support includes at least a first segment, a second segment, and a third segment,
the first segment is connected to the base rigidly connected to the frame, and
the third segment provides the top of the cup support and is flexibly connected to the first segment via the second segment.

19. The seat assembly as recited in claim 18, wherein:
when the cup support is in a fully collapsed position, the top of the cup support is arranged at a first height above the base, and the first, second, and third segments overlap one another, and the second segment is arranged radially between the first and third segments,
when the cup support is in an intermediate position, the top of the cup support is arranged at a second height above the base, the second height greater than the first height, and the second segment is at least partially folded, and
when the cup support is in the fully expanded position, the top of the cup support is arranged at a third height above the base, the third height being greater than the second height, and the first, second, and third segments are axially spaced-apart from one another.

20. The seat assembly as recited in claim 16, wherein:
the cup support is a first cup support,
the cup holder assembly includes a second cup support spaced-apart from the first cup support, and
the second cup support is substantially identical to the first cup support.

* * * * *

UNITED STATES PATENT AND TRADEMARK OFFICE
CERTIFICATE OF CORRECTION

| | | |
|---|---|---|
| PATENT NO. | : 11,772,538 B2 | Page 1 of 1 |
| APPLICATION NO. | : 17/263599 | |
| DATED | : October 3, 2023 | |
| INVENTOR(S) | : Yintai Jiang and Jianhu Wang | |

It is certified that error appears in the above-identified patent and that said Letters Patent is hereby corrected as shown below:

On the Title Page

Change "(72) Inventors: Yintai Jiang, Shanghai(CN); Jianhu Wang, Novi,MI(US)" to --(72) Inventors: Yintai Jiang, Shanghai (CN); Jianhua Wang, Novi, MI (US)--

Signed and Sealed this
Fifth Day of December, 2023

Katherine Kelly Vidal
*Director of the United States Patent and Trademark Office*